United States Patent
Weyerhaeuser et al.

(10) Patent No.: US 10,140,335 B2
(45) Date of Patent: Nov. 27, 2018

(54) CALCULATION SCENARIOS WITH EXTENDED SEMANTIC NODES

(71) Applicant: SAP SE, Walldorf (DE)

(72) Inventors: Christoph Weyerhaeuser, Heidelberg (DE); Tobias Mindnich, Sulzbach (DE); Johannes Merx, Heidelberg (DE); Alena Bakulina, Mannheim (DE)

(73) Assignee: SAP SE, Walldorf (DE)

( * ) Notice: Subject to any disclaimer, the term of this patent is extended or adjusted under 35 U.S.C. 154(b) by 389 days.

(21) Appl. No.: 14/945,300

(22) Filed: Nov. 18, 2015

(65) Prior Publication Data

US 2017/0139987 A1    May 18, 2017

(51) Int. Cl.
*G06F 17/30* (2006.01)

(52) U.S. Cl.
CPC .............. *G06F 17/30427* (2013.01)

(58) Field of Classification Search
CPC ........................................... G06F 7/00
USPC ............................. 707/713, 752
See application file for complete search history.

(56) References Cited

U.S. PATENT DOCUMENTS

| | | | | |
|---|---|---|---|---|
| 6,460,025 B1 * | 10/2002 | Fohn | ............... | G06F 17/30994 706/45 |
| 7,613,602 B2 * | 11/2009 | Kanawa | ............ | G06F 17/2247 704/1 |
| 8,195,643 B2 * | 6/2012 | Weyerhaeuser | .. | G06F 17/30463 707/713 |
| 8,630,860 B1 * | 1/2014 | Zhang | ............... | G06F 17/30026 704/235 |
| 9,213,737 B2 * | 12/2015 | Weyerhaeuser | .. | G06F 17/30412 |
| 2007/0027671 A1 * | 2/2007 | Kanawa | ............ | G06F 17/2247 704/4 |
| 2014/0075004 A1 * | 3/2014 | Van Dusen | ............ | H04L 41/04 709/223 |
| 2015/0324344 A1 * | 11/2015 | Williams | ............... | E21B 47/00 715/226 |

* cited by examiner

*Primary Examiner* — Kim T Nguyen
(74) *Attorney, Agent, or Firm* — Mintz, Levin, Cohn, Ferris, Glovsky and Popeo, P.C.

(57) ABSTRACT

A calculation engine is described that executes calculation scenarios comprising a plurality of calculation nodes that each specify operations to be performed to execute the query. One of the nodes can be a semantic node that is used to modify a higher-level programming language query that stacks the calculation scenario on top of another semantic node based calculation scenario for operations that call for processing of non-processable key figures. Non-processable key figures being key figures that produce incorrect semantics when processed by higher-level calculation scenarios. Related apparatus, systems, methods, and articles are also described.

20 Claims, 8 Drawing Sheets

CALCULATION SCENARIOS WITH EXTENDED SEMANTIC NODES

TECHNICAL FIELD

The subject matter described herein relates to the use of calculation scenarios with semantic nodes that provide special handling operations for queries.

BACKGROUND

Higher-level programming languages, such as Multidimensional Expressions (MDX) or FIREFLY software tools, are becoming ubiquitous. Higher-level programming languages are typically programming languages that are independent of the computer system on which they are operated and are more similar to human languages than machine languages, which directly control the operations of a computer system.

Computer operators expect to be able to give computer systems instructions in higher-level programming languages. The higher-level programming languages have to be translated, often through multiple layers, to machine language to perform the operations requested by the computer operator.

SUMMARY

In one aspect a method for implementation by one or more data processors forming at least part of a computer system is described. The method can include the performance of one or more operations. The one or more operations, can include receiving, by a database server, a higher-level language query associated with a calculation scenario. The calculation scenario can define a data flow model that includes a plurality of calculation nodes. Each calculation node can define one or more operations to execute on the database server. At least one of the calculation nodes can be a semantic node specifying an operation involving non-processable database elements. Non-processable database elements being elements that when processed by higher-level calculation view engines do not preserve semantical correctness.

The higher-level programming language query can be modified using the semantic node. The calculation scenario can be modified based on the modified higher-level programming language query. The modified calculation scenario can be instantiated by the database server. The operations defined by the calculation nodes of the modified calculation scenario can be executed to result in at least one result set. The at least one result set can be provided by the database server to the application server.

In some variations, the query can be received from a remote application server. The received higher-level programming language query can be configured to specify an aggregation function on a calculated attribute. Modifying the higher-level programming language query using the semantic node can override the aggregation function on the calculated attribute causing the calculated attribute to be copied to the higher-level programming language query.

In some variations, at least a portion of paths and/or attributes defined by the calculation scenario are not required to respond to the higher-level programming language query. The instantiated calculation scenario can omit the paths and attributes defined by the calculation scenario that are not required to respond to the higher-level programming language query.

In some variations, at least one of the calculation nodes can filter results obtained from the database server. At least one of the calculation nodes can sort results obtained from the database server.

The calculation scenario can be instantiated in a calculation engine layer by a calculation engine.

The calculation engine layer can interact with a physical table pool and a logical layer. The physical table pool can comprise physical tables containing data to be queried. The logical layer can define a logical metamodel joining at least a portion of the physical tables in the physical table pool.

An input for each calculation node can comprise one or more of: a physical index, a join index, an OLAP index, and another calculation node. Each calculation node can have at least one output table that is used to generate the final result set. At least one calculation node can consume an output table of another calculation node.

In some variations, executing operations defined by the calculation nodes of the modified calculation scenario can include forwarding the query to a calculation node in the calculation scenario that is identified as a default node when the query does not specify a calculation node at which the query should be executed.

The query can identify a particular calculation node. Executing operations defined by the calculation nodes of the modified calculation scenario can include forwarding the query to the calculation node specified in the query at which the query should be executed.

The calculation scenario can comprise database metadata. The calculation scenario can be exposed as a database calculation view.

In some variations, executing operations defined by the calculation nodes of the modified calculation scenario can include invoking, by a higher-level programming language runtime engine, a calculation engine to execute the calculation scenario behind the database calculation view. The calculation engine can invoke the higher-level programming language runtime engine for executing set operations.

The higher-level programming language runtime engine can invoke the calculation engine when executing higher-level programming language queries with calculation views.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
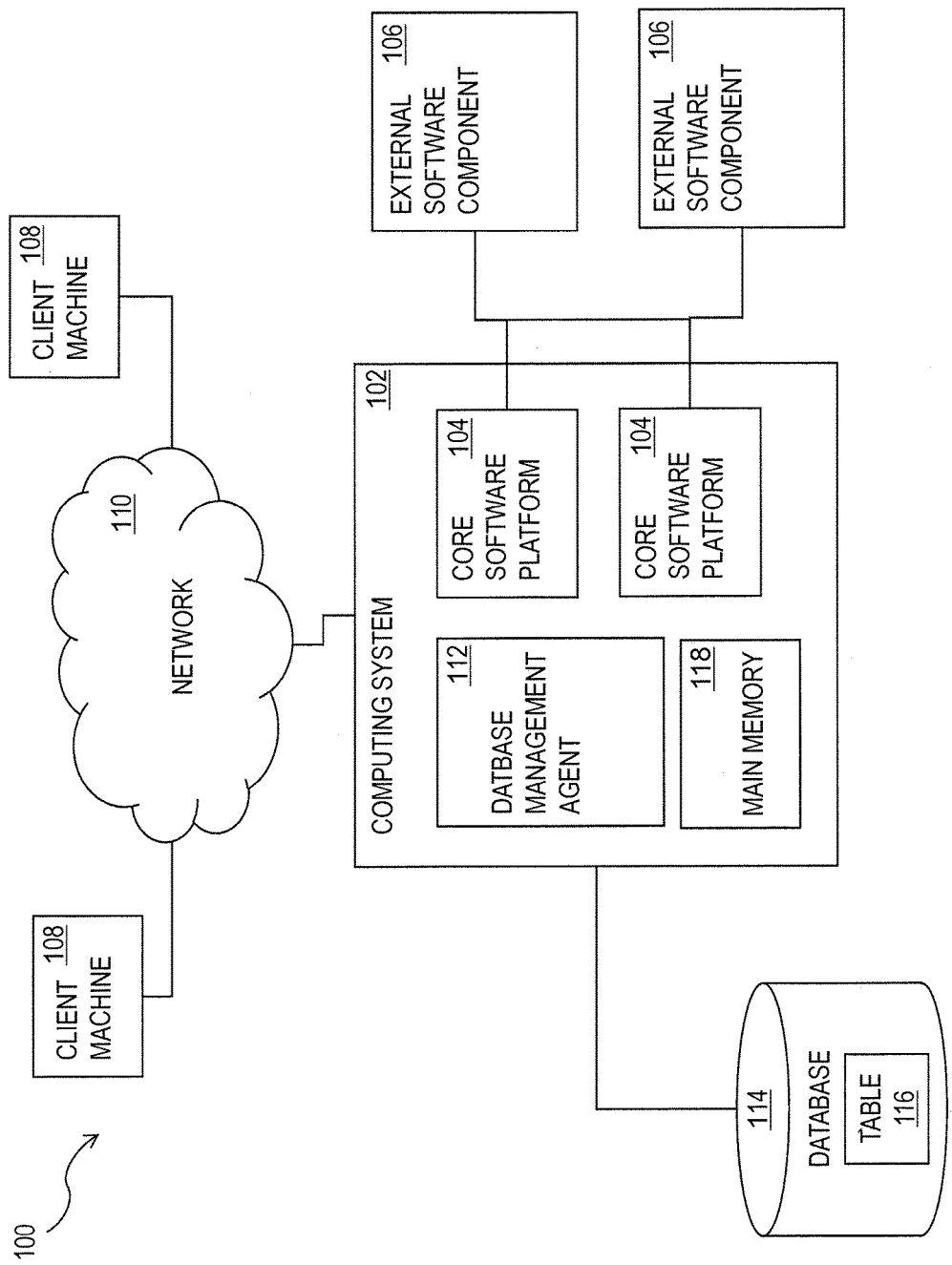
FIG. 1 shows a diagram of a system that can implement one or more features consistent with the current subject matter.

A database system can typically comprise a database management system. The database management system can comprise multiple layers or levels. The different layers can be configured to perform different types of operations. For example, the lowest layer, or physical layer, of a database management system can be configured to perform the actual operations requested by the users of the database management system. At the physical layer, a conceptual instruction provided by a user may have been translated into many instructions that are readable by the database.

A middle layer, or logical layer, can be configured to consolidate external concepts and instructions into an intermediate data structure. The intermediate data structure can be capable of being devolved into the physical instructions for implementation at the physical layer. The logical layer can be configured to provide execution pathways of operations to multiple different databases and/or database tables, in response to instructions received from the top layer, or view layer.

The view layer can be configured to implement applications that are provided to users of the database management system. Database operations can be represented as database access. In some variations, individual databases within a database system can be viewed as the same at this layer, despite differences in content and operation of those individual databases.

In some variations, the view layer can be a calculation engine layer. The calculation engine layer can be configured to facilitate the processing of user queries and requests using diverse calculation operations. When processing queries, having the tables loaded into the main memory of the database management system increases the efficiency at which the database management system can execute queries, improving the optimization of the database management system.

High-level language programs can be executed at the application layer, or calculation level. The calculation level can be the level on which a calculation engine is executed. Queries can be written in a high-level language. High-level language runtime engines can be used to compile queries written in the high-level language program. High-level languages can include Multidimensional Expressions (MDX), INA/Firefly, or the like. High-level programming languages can include programming languages with strong abstraction from the details of the computer. High-level programming languages can use natural language elements, be easier to use, or may automate (or even hide) significant areas of computing systems (e.g. memory management), making the process of developing a program simpler and more understandable relative to a lower-level language.

Higher-level programming languages, however, can come with an abstraction penalty. Higher-level programming languages can, for example, include more generic data structures, run-time interpretation and intermediate code files. These often result in slower execution speeds, higher memory consumption, larger binary program size, and summation errors, compared to lower-level programming languages. Summation errors can be generated by the higher-level programming languages causing the summing of non-summable key figures.

The presently described subject matter can be configured to extend an internal API of the calculation engine to provide higher-level programming languages with more insight into the underlying calculation views. This can facilitate overcoming the boundaries between the higher-level programming language runtime environment and the calculation view runtime environment, interconnect the two runtime environments in a semantically correct way, and the like.

In some variations, the API can push lower-level views from one level of the database system, to a higher-level of the database system, by avoiding aggregating the lower-level views.

Higher-level programming language queries are being used to generate reports. Reports are typically generated by reading data in an aggregated manner. This means that the higher-level programming language statements issued by the applications, can contain a GROUP BY clause and aggregation-functions on keyfigures (e.g. sum,min,max). Consequently, due to the aggregation function(s), the higher-level programming language queries can cause non-summable key figures to become summed, thereby providing unexpected results.

The models/views used by database applications can be created by a modeler. When the modeler is decoupled from the database applications that display the data, additional metadata information about the views (for example, ViewAttribute and Keyfigures) can be stored in database tables that are read by clients.

This concept gives the end-user the freedom to create a reporting-view once and consume it by different database applications. Due to this generic approach the database applications do not have the ability and logic to post-process the extracted information. Therefore the database must provide the correct result for all types of queries to guarantee a correct handling in all database applications. In most cases, this is done easily because the views and the queries behave in a relational manner as defined in a standard for the database application programming language, but in some cases the database must handle queries differently in order to provide the correct/expected result to the database applications.

Typically those special cases occur when more complex operations like Exception Aggregation (Count Distinct), non-summable calculated keyfigures or currency conversion are used in the views.

FIG. 1 shows a diagram of a system 100 that can implement one or more features consistent with the current subject matter. A computing system 102 can include one or more core software platform modules 104 providing one or more features of a business software system or other software that includes database management features. The computing system can also aggregate or otherwise provide a gateway via which users can access functionality provided by one or more external software components 106. One or more client machines 108 can access the computing system, either via a direct connection, a local terminal, or over a network 110 (e.g. a local area network, a wide area network, a wireless network, the Internet, or the like).

A database management agent 112 or other comparable functionality can access a database 114 that includes at least one table 116, which can in turn include at least one column. The database management agent 112 can implement one or more of the features of implementations discussed herein. The database table can store any kind of data, potentially including but not limited to definitions of business scenarios, business processes, and one or more business configurations as well as transactional data, metadata, master data, etc. relating to instances or definitions of the business scenarios, business processes, and one or more business configurations, and/or concrete instances of data objects and/or business objects that are relevant to a specific instance of a business scenario or a business process, and the like.

The database management agent 112 or other comparable functionality can be configured to load a database table 116, or other comparable data set, into the main memory 118. The database management agent 112 can be configured to load the information from the database 114 to the main memory 118 in response to receipt of a query instantiated by a user or computer system through one or more client machines 108, external software components 106, core software platforms 104, or the like.

Figure 2:
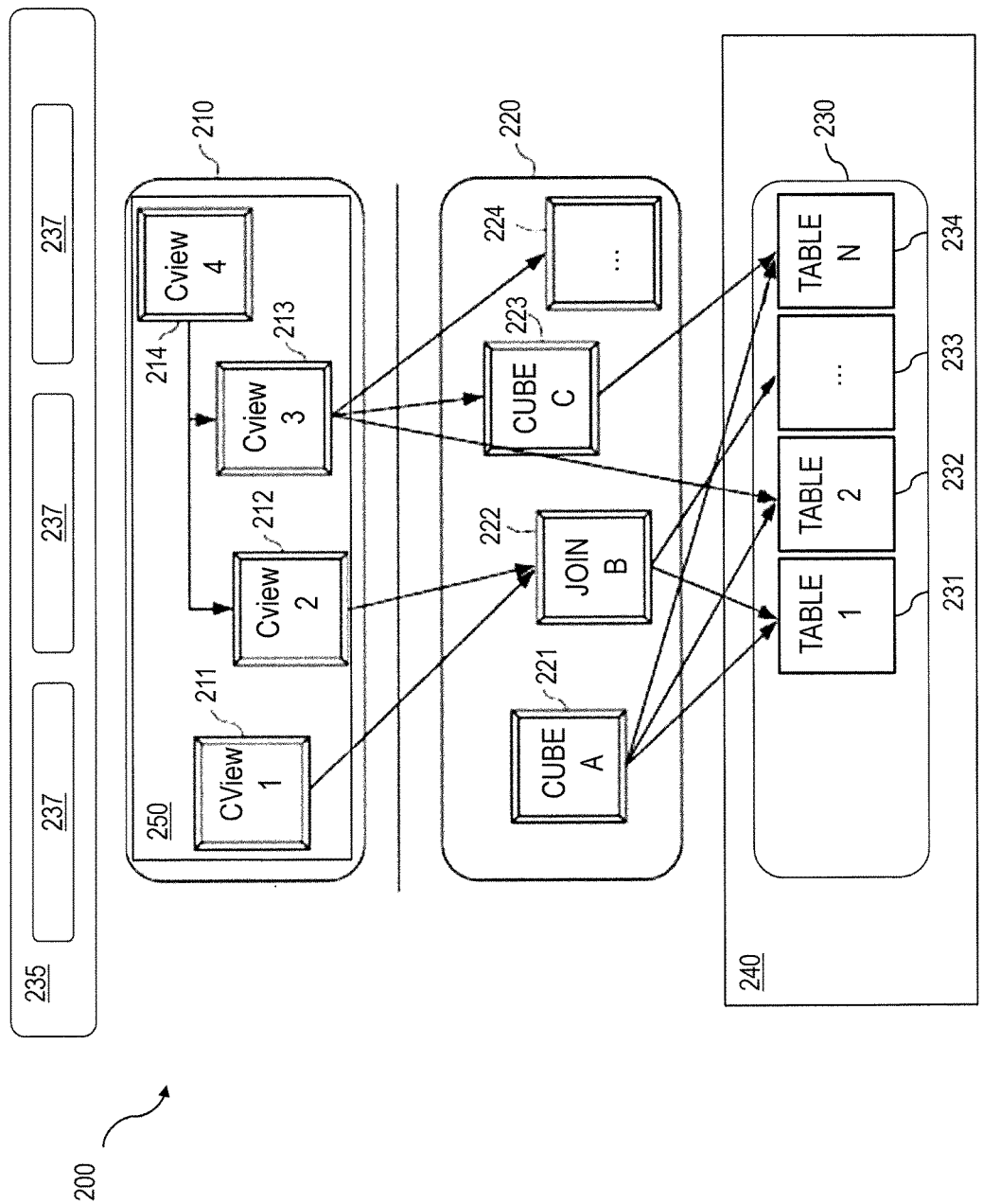
FIG. 2 is a diagram that illustrates a computing architecture having one or more features consistent with the current subject matter.
Figure 3:
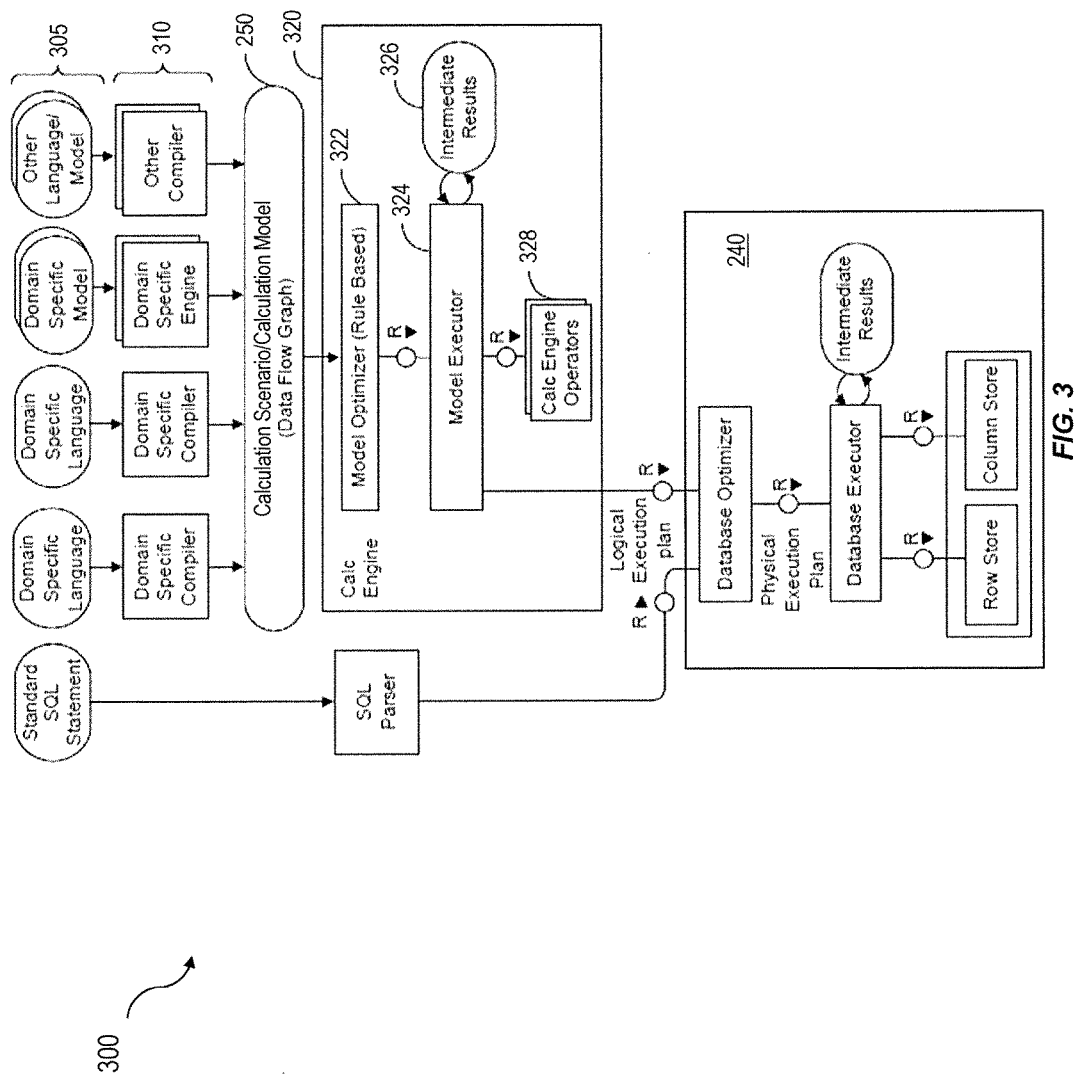
FIG. 3 is a diagram illustrating a sample architecture for request processing and execution control, the sample architecture having one or more features consistent with the current subject matter.

FIG. 2 is a diagram that illustrates a computing architecture 200 including a database system that includes three layers: a top layer, calculation engine layer 210, an intermediate layer, or logical layer 220, and a top layer, or physical table-pool 230. One or more application servers 235 implementing database client applications 237 can access the database system 300, as shown in FIG. 3. Calculation scenarios can be executed by a calculation engine, which can form part of a database or which can be part of the calculation engine layer 210 (which is associated with the database). The calculation engine layer 210 can be configured to support the core software platform 104, external software component 106, one or more programs executed on client machine(s) 108, or the like.

The calculation engine layer 210 can be based on and/or interact with the other two layers, the logical layer 220 and the physical table pool 230. In some variations, the physical table pool 230 can comprise database operations configured to access and perform the database operations on the individual tables. In some variations, the basis of the physical table pool 230 consists of physical tables (called indexes) containing the data, which can be stored on one more database servers 240. Various tables 231-234 can be joined using logical metamodels 221-224 defined by the logical layer 220 to form an index. For example, the tables 231-234 in a cube (e.g. an online analytical processing or "OLAP" index) can be assigned roles (e.g., fact or dimension tables) and joined to form a star schema. It is also possible to form join indexes (e.g. join index B 222 in FIG. 2), which can act like database views in computing environments such as the Fast Search Infrastructure (FSI) available from SAP SE of Walldorf, Germany.

A calculation scenario 250 can include individual nodes (e.g. calculation nodes) 211-214, which in turn can each define operations such as joining various physical or logical indexes and other calculation nodes (e.g., CView 4 is a join of CView 2 and CView 3). That is, the input for a node 211-214 can be one or more physical, join, or OLAP indexes or calculation nodes. A calculation node as used herein represents a operation such as a projection, aggregation, join, union, minus, intersection, and the like. Additionally, as described below, in addition to a specified operation, calculation nodes can sometimes be enhanced by filtering and/or sorting criteria. In some implementations, calculated attributes can also be added to calculation nodes.

In a calculation scenario 250, two different representations can be provided, including a) a pure calculation scenario in which all possible attributes are given and b) an instantiated model that contains only the attributes requested in the query (and required for further calculations). Thus, calculation scenarios can be created that can be used for various queries. With such an arrangement, a calculation scenario 250 can be created which can be reused by multiple queries even if such queries do not require every attribute specified by the calculation scenario 250. For on-the-fly scenarios this means that the same calculation scenario (e.g., in XML format, etc.) can be used for different queries and sent with the actual query. The benefit is that on application server side the XML description of a calculation scenario can be used for several queries and thus not for each possible query one XML has to be stored.

Every calculation scenario 250 can be uniquely identifiable by a name (e.g., the calculation scenario 250 can be a database object with a unique identifier, etc.). Accordingly, the calculation scenario 250 can be queried in a manner similar to a view in a SQL database. Thus, the query is forwarded to the calculation node 211-214 for the calculation scenario 250 that is marked as the corresponding default node. In addition, a query can be executed on a particular calculation node 211-214 (as specified in the query). Furthermore, nested calculation scenarios can be generated in which one calculation scenario 250 is used as source in another calculation scenario (e.g. via a calculation node 211-214 in this calculation scenario 250). Each calculation node 211-214 can have one or more output tables. One output table can be consumed by several calculation nodes 211-214.

Further details regarding calculation engine architecture and calculation scenarios can be found in U.S. Pat. No. 8,195,643, the contents of which are hereby fully incorporated by reference.

FIG. 3 is a diagram 300 illustrating a sample architecture for request processing and execution control. As shown in FIG. 3, artifacts 305 in different domain specific languages can be translated by their specific compilers 310 into a common representation called a "calculation scenario" 250

(which is also referred to in FIG. 3 as a calculation model). To achieve enhanced performance, the models and programs written in these languages are executed inside the database server 240. This arrangement eliminates the need to transfer large amounts of data between the database server 240 and a client application 237, which can be executed by an application server 235. In some variations the artifacts 305, can include higher-level language models. To achieve enhanced performance, the models and programs written in these languages can be executed inside the database server. In some variations, the models and programs can be, at least partially, executed on client platforms. For example, a higher-level language model or program can be parsed into a lower-language model or program, or to machine language operations and transmitted to the database server. Results, or graphical representations of the results, of the execution of the machine language operations by the database server can be transmitted back to the client platform. This arrangement can eliminate the need to transfer large amounts of data between the database server and the client application. This arrangement can alleviate some of the operations need to be performed by the database server by making the client platform perform some of the operations in the translation of the higher-level language model or program. Once the different artifacts 305 are compiled into this calculation scenario 250, they can be processed and executed in the same manner. A calculation engine 320 executes the calculation scenarios 250.

A calculation scenario 250 can be a directed acyclic graph with arrows representing data flows and nodes that represent operations. Each node includes a set of inputs and outputs and an operation (or optionally multiple operations) that transforms the inputs into the outputs. In addition to their primary operation, each node can also include a filter condition for filtering the result set. The inputs and the outputs of the operations can be table valued parameters (i.e., user-defined table types that are passed into a procedure or function and that provide an efficient way to pass multiple rows of data to a client application 237 at the application server 235). Inputs can be connected to tables or to the outputs of other nodes. A calculation scenario 250 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 250 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result, he or she can use a split. Then, the nodes can be automatically multiplied between split and merge and partition the data.

A calculation scenario 250 can be defined as part of database metadata and invoked multiple times. A calculation scenario 250 can be created, for example, by a SQL statement "CREATE CALCULATION SCENARIO <NAME> USING <XML or JSON>". Once a calculation scenario 250 is created, it can be queried (e.g., "SELECT A, B, C FROM <scenario name>", etc.). In some cases, databases can have pre-defined calculation scenarios 250 (default, previously defined by users, etc.). Calculation scenarios 250 can be persisted in a repository (coupled to the database server 240) or in transient scenarios. Calculation scenarios 250 can also be kept in-memory.

Calculation scenarios 250 are more powerful than traditional SQL queries or SQL views for many reasons. One reason is the possibility to define parameterized calculation schemas that are specialized when the actual query is issued. Unlike a SQL view, a calculation scenario 250 does not describe the actual query to be executed. Rather, it describes the structure of the calculation. Further information is supplied when the calculation scenario is executed. This further information can include parameters that represent values (for example in filter conditions). To provide additional flexibility, the operations can optionally also be refined upon invoking the calculation model. For example, at definition time, the calculation scenario 250 may contain an aggregation node containing all attributes. Later, the attributes for grouping can be supplied with the query. This allows having a predefined generic aggregation, with the actual aggregation dimensions supplied at invocation time. The calculation engine 320 can use the actual parameters, attribute list, grouping attributes, and the like supplied with the invocation to instantiate a query specific calculation scenario 250. This instantiated calculation scenario 250 is optimized for the actual query and does not contain attributes, nodes or data flows that are not needed for the specific invocation.

When the calculation engine 320 gets a request to execute a calculation scenario 250, it can first optimize the calculation scenario 250 using a rule based model optimizer 322. Examples for optimizations performed by the model optimizer can include "pushing down" filters and projections so that intermediate results 326 are narrowed down earlier, or the combination of multiple aggregation and join operations into one node. The optimized model can then be executed by a calculation engine model executor 324 (a similar or the same model executor can be used by the database directly in some cases). This includes decisions about parallel execution of operations in the calculation scenario 250. The model executor 324 can invoke the required operators (using, for example, a calculation engine operators module 328) and manage intermediate results. Most of the operators are executed directly in the calculation engine 320 (e.g., creating the union of several intermediate results). The remaining nodes of the calculation scenario 250 (not implemented in the calculation engine 320) can be transformed by the model executor 324 into a set of logical database execution plans. Multiple set operation nodes can be combined into one logical database execution plan if possible.

The calculation scenarios 250 of the calculation engine 320 can be exposed as a special type of database views called calculation views. That means a calculation view can be used in SQL queries and calculation views can be combined with tables and standard views using joins and sub queries. When such a query is executed, the database executor inside the SQL processor needs to invoke the calculation engine 320 to execute the calculation scenario 250 behind the calculation view. In some implementations, the calculation engine 320 and the SQL processor are calling each other: on one hand the calculation engine 320 invokes the SQL processor for executing set operations and SQL nodes and, on the other hand, the SQL processor invokes the calculation engine 320 when executing SQL queries with calculation views.

Similarly, the calculation view can be used in higher-level programming language queries. Higher-programming language queries can use the calculations views as simply another data source, such as tables and standard views. This can lead to the higher-level programming language queries summing non-summable key figures providing unexpected results. The calculations scenarios 250 of the calculation engine 320 can include individual nodes 211-214. The calculation scenarios 250 can be modified to include semantic nodes capable of providing information to the higher-level programming language query runtime engine that can cause the higher-level programming engine runtime engine to properly execute the operations in the calculation scenarios 250.

Figure 4:
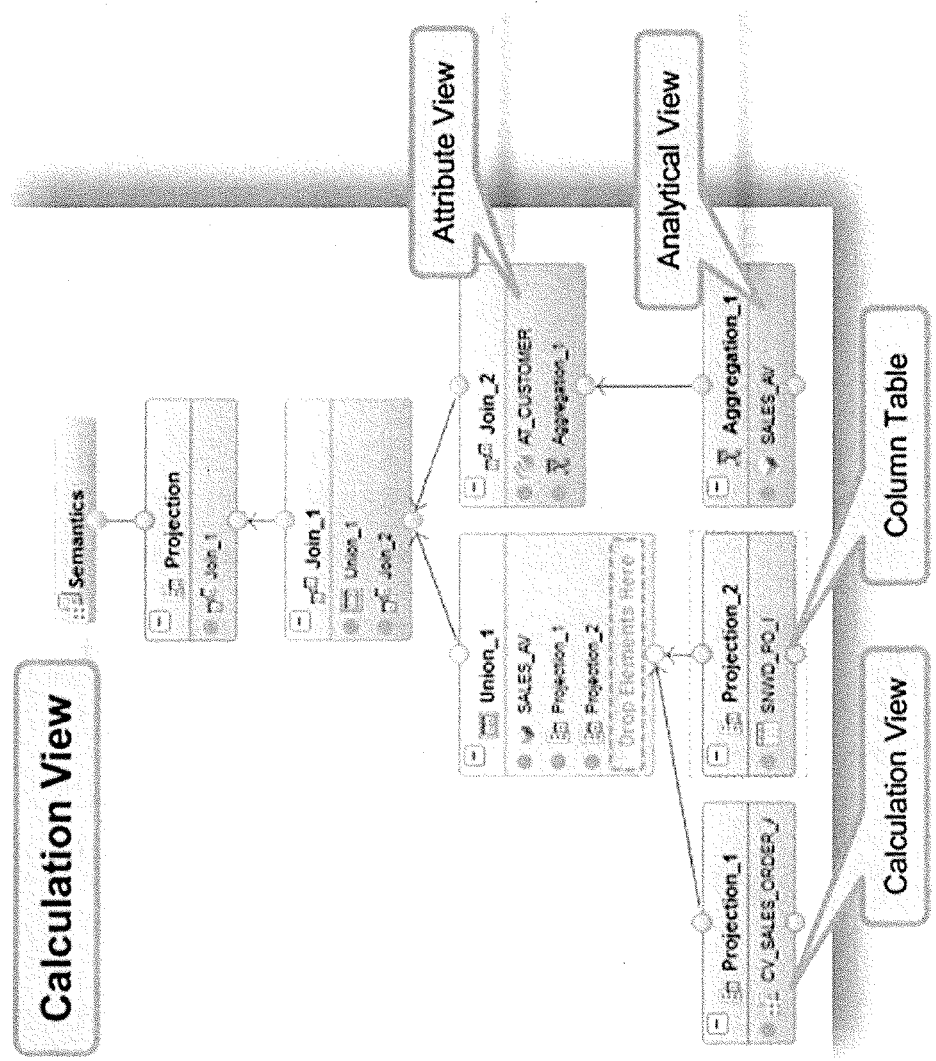
FIG. 4 is an illustration of an exemplary graphical calculation view having one or more features consistent with the current subject matter.

FIG. 4 is an illustration of an exemplary graphical calculation view 400 having one or more features consistent with the current subject matter. The graphical calculation view 400 is an example of a calculation view that can be presented to a user of the database management system. The calculation view can also be presented to a user in a scripted fashion. For example, an SQL script representing the calculation view can be presented to the user.

The attributes of the incoming datasets utilized by the rules of model optimizer 322 can additionally or alternatively be based on an estimated and/or actual amount of memory consumed by the dataset, a number of rows and/or columns in the dataset, and the number of cell values for the dataset, and the like.

Calculation scenarios as described herein can include a type of node referred to herein as a semantic node (or sometimes semantic root node). A database modeler can flag the root node (output) in a graphical calculation view to which the queries of the database applications directed as semantic node. This arrangement allows the calculation engine 320 to easily identify those queries and provide a proper handling of query in all cases.

In calculation views of a database modeler, it can be possible to create calculated keyfigures at the semantic node that are not summable (e.g., expressions such as "keyfigure A" divided by "keyfigure B" or "keyfigure A" plus a constant value, etc). Those formulas can have different results depending at which aggregation level the formula is evaluated. In most cases, the correct/expected result is obtained when formulas are calculated at latest possible instance within the nodal hierarchy.

The current subject matter can help address those situations in which generic metadata information provided by the database to the database application(s) does not contain such highly specified information, and additionally most of consumer/developer of the database application do not have a complete understanding of such semantics. Hence the database application treats aggregation operations involving such a keyfigure like every standard keyfigure even though this might result in an incorrect result set. However, with the use of the semantic node, the calculation engine 320 knows about the different semantic and changes the higher-level language query (which in turn requires the calculation scenario to be modified) in a way that it creates the correct results.

As stated above, the semantic node can be the top-most node in a calculation scenario in the higher-level language. If the top-most node in a calculation node is an aggregating node, the calculation engine 320 can distinguish between keyfigures/measures which have an aggregation function like SUM, MIN, MAX, . . . and the ViewAttributes which forms the GROUP BY.

For example:

| COUNTRY (ViewAttribute) | CITY (ViewAttribute) | SALES (Keyfigure SUM) |
|---|---|---|
| US | NY | 1000 |
| US | LA | 2000 |
| GER | WDF | 500 |
| GER | B | 500 |

If the top node is an aggregation with keyfigure SALES (aggregation function SUM) then a SELECT SALES, COUNTRY FROM MY_CALCSCEN will return:

| COUNTRY | SALES |
|---|---|
| US | 3000 |
| GER | 1000 |

This is equivalent to the query: SELECT sum(SALES), COUNTRY FROM MY_CALCSCEN because the sum( ) is already defined in the calculation scenario.

Assuming that the calculation scenario is queried with SELECT MIN(SALES), COUNTRY FROM MY_CALCSCEN, the result would be the same.

| COUNTRY | SALES |
|---|---|
| US | 3000 |
| GER | 1000 |

Because the query in SQL would be:
SELECT min(SALES), COUNTRY FROM (SELECT sum(SALES), COUNTRY FROM MY_CALCSCEN). So first SALES is summed up and afterwards min( ) is applied which does not change the result anymore.

The semantic node now has the task to overwrite the aggregation function (by modifying the query and using the modified query to modify the calculation scenario) from to top most node of with the query an aggregation function is provided:
SELECT SALES, COUNTRY FROM MY_CALCSCEN will return [assuming default aggregation type is specified with sum( )]:

| COUNTRY | SALES |
|---|---|
| US | 3000 |
| GER | 1000 |

SELECT sum(SALES), COUNTRY FROM MY_CALCSCEN will return:

| COUNTRY | SALES |
|---|---|
| US | 3000 |
| GER | 1000 |

SELECT min(SALES), COUNTRY FROM MY_CALCSCEN will return:

| COUNTRY | SALES |
|---|---|
| US | 1000 |
| GER | 500 |

An extension to the internal API of the calculation engine can be generated for the higher-level programming language query. The extension can be generated based on the key figures included in the higher-level programming language query. It enables the runtime engines of the higher-level languages to get more insight into the underlying calculation view.

The modeling API can be extended, based upon the key figures included in the query. Key operators of the underlying calculation view can be identified and copied into the stacked calculation model as base nodes. The stacked calculation model having been generated by the higher-level programming language. Thus, the runtime engine of the higher-level programming language can be adapted to understand the semantic of, for example, key figures in the base model and adapt the higher-level programming language model to the semantic or extend the semantic node, where necessary.

Figure 5:
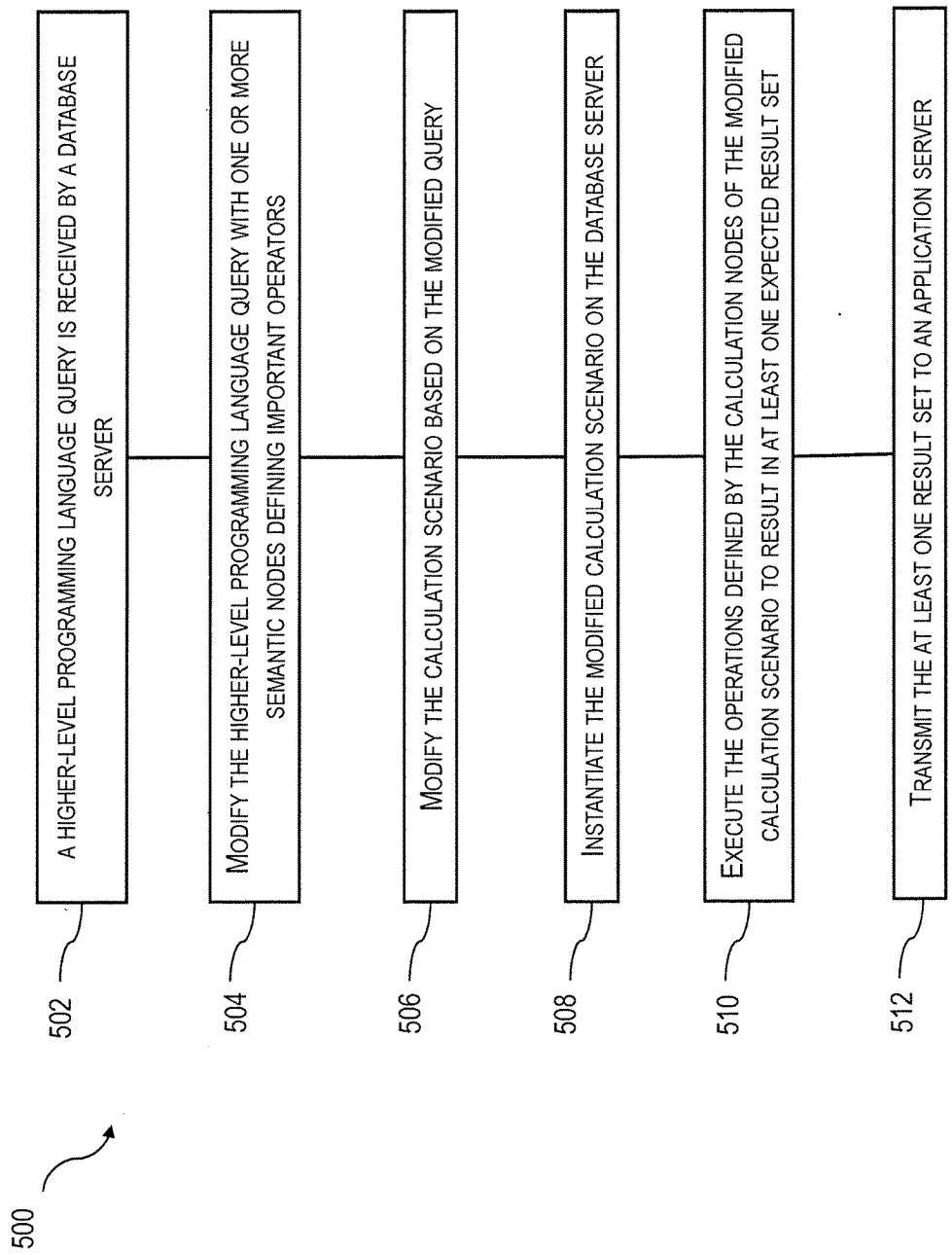
FIG. 5 is a process flow diagram illustrating a method for generating correct result sets for queries generated using a higher-level programming language, the method having one or more elements consistent with the current subject matter.

FIG. 5 is a process flow diagram illustrating a method 500 for generating correct result sets for queries generated using a higher-level programming language, the method having one or more elements consistent with the current subject matter.

At 502, a query is received by a database server, such as computing system 102. The query can be a higher-level programming language query. The query can be received from a core software platform 106, a remote application server, such as a server configured to execute external software components 106, or the like. The query can be associated with a calculation scenario that defines a data flow model that includes a plurality of calculation nodes. Each calculation node can define one or more operations to execute on the database server. In some variations, at least one of the nodes is a semantic node specifying an operation requiring special handling. The semantic node can be a higher-level programming language semantic node. In some variations, the semantic node can include an operation to be performed on non-summable key figures. In some variations, the semantic node can include a link to another node. The link can be a unidirectional link, bidirectional link, omnidirectional link, or other type of link.

At 504, the database server can be configured to modify the higher-level programming language query. The database server can modify the higher-level programming language query with one or more semantic nodes. The database server can be configured to modify the higher-level programming language query with operator(s) defined by the one or more semantic nodes. The database server can be configured to identify operators defined by the semantic nodes that are important, or ones that could cause erroneous results when aggregated, and operators that are unimportant. The higher-level programming language query can be updated to include the important operators such that further analysis can be performed by the higher-level programming language query on those operators.

At 506, the database server can be configured to modify the calculation scenario based on the modified query.

At 508, the modified calculation scenario can be instantiated by the database server.

At 510, the database server can be configured to execute the operations defined by the calculation nodes of the modified calculation scenario to result in at least one result set.

At 512, the database server can be configured to transmit the at least one result set to an application server.

The presently described subject matter can enable an application developer to define a data flow model in a higher-level programming language that can push the data flow model down to a database. A developer can define a calculation scenario which describes this algorithm in a general way as data flow consisting of calculation nodes. A calculation node as used herein represents a operation such as a projection, aggregation, join, union, minus, intersection, and the like. Additionally, as described below, in addition to a specified operation, calculation nodes can sometimes be enhanced by filtering and/or sorting criteria. In some implementations, calculated attributes can also be added to calculation nodes.

In some variations, during query time (i.e., the time in which a database is queried), the data flow specified by a calculation scenario is instantiated. During instantiation, the calculation scenario is compacted to only include query requirements by removing useless paths and attributes (that are not requested) within the calculation scenario. This compaction reduces calculation time and also minimizes the total amount of data that must be processed.

On top of the calculation engine layer, there may be multiple other analytical layers, or application layers. These layers may be defined in a higher-level programming language. Operators provided at the calculation engine layer may be aggregated by one or more aggregators between the calculation engine layer and the higher-level programming language layer. During aggregation, aggregators can treat calculation views as any other data source, causing non-summable elements in the query at the calculation engine layer to be summed, providing unexpected and incorrect results.

Non-summable elements may be referred to herein as non-processable elements. Non-summable or non-processable does not necessarily mean that the elements cannot be physically summed and/or processed, although that may be the case. Non-summable or non-processable also means that the elements may provide inaccurate or erroneous results when summed or processed. For example, aggregated data provided from a base calculation view engine to a higher-level calculation view engine may be treated by the higher-level calculation view engine the same as any other data source. When aggregating this previously aggregated data, erroneous results may be produced. Consequently, the semantic correctness is not preserved when processed by the higher-level calculation view engine.

Figure 7:
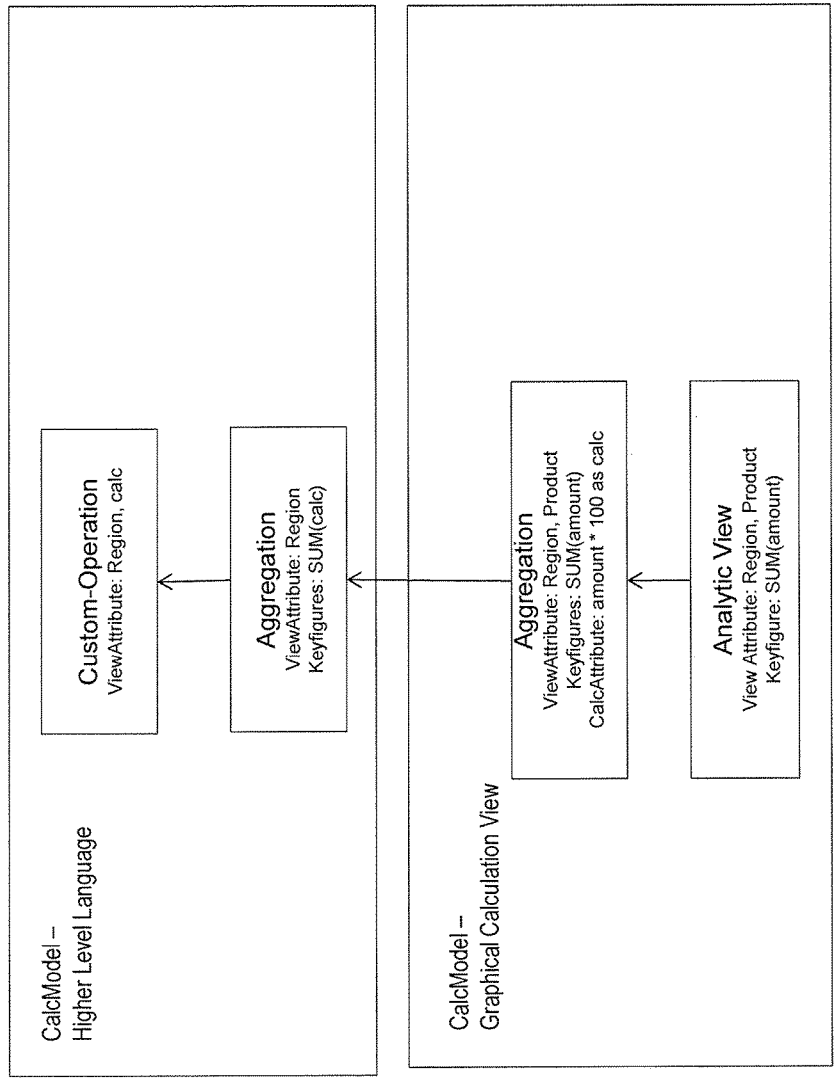
FIG. 7 is a diagram of a query specified by a database application without application of the semantic node for modifying higher-level programming language queries, having one or more elements consistent with the current description; and, FIG. 8 is a diagram of a query specified by a database application with application of the semantic node for modifying higher-level programming language queries, having one or more elements consistent with the current description.

The query illustrated in FIG. 7 can include custom operations developed in a higher-level programming language. The higher level programming language is provided at a higher architectural layer, stacked on top of the calculation view of the calculation engine layer. Operations defined by the higher-level programming language layer can be stacked on to columns within the calculation engine layer.

The high-level programming language query operations can operate on one or more elements of the calculation layer. Some of these elements of the calculation layer can be non-summable elements. Nevertheless, the higher-level programming language operations can operate on these non-summable elements causing erroneous results.

An Application Programming Interface (API) can be provided to provide visibility of the calculation layer or lower layers to the higher-level programming language layer. The API can be configured to see the semantic of a base calculation engine view. The API can expose the root semantics in the calculation engine to the application layer so that that the operators executed at the application layer can evaluate the query properly. The API can be configured to only provide those non-summable elements to the higher-level programming language layer. In some variations, the non-summable elements can include semantic information.

Figure 6:
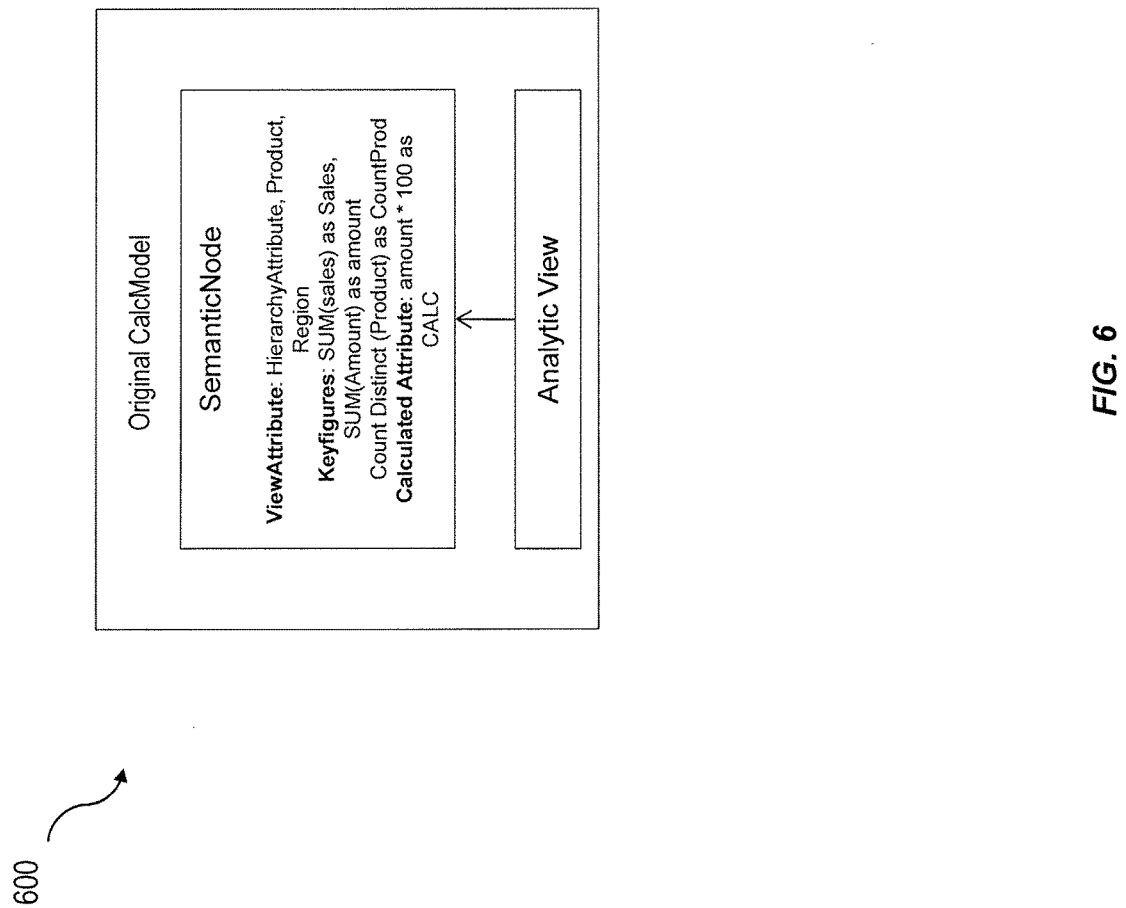
FIG. 6 is a diagram of an exemplary extended semantic node having one or more features consistent with the current subject matter.

FIG. 6 is a diagram 600 of an exemplary query defined in a modeler having one or more features consistent with the current subject matter. The diagram 600 illustrates an extended semantic node configured to deliver information associated with the analytic view to the higher-level programming language engine. The information provided to the higher-level programming language engine can provide insight to the analytic view.

FIG. 7 is a diagram 700 of a query specified by a database application without application of the semantic node for modifying higher-level programming language queries, having one or more elements consistent with the current description.

The calculation model of the higher-level language is stacked above the calculation model of a lower-level language, or base calculation view. Depending on the elements of the base calculation view, erroneous results may be generated due to the aggregation of elements that should not be aggregated for the higher-level programming language calculation view.

Diagram 700 of FIG. 7 shows that there are two aggregations, one at the base calculation view and the other in the higher-level programming language calculation view. This can cause elements aggregated in the base view, or base calculation engine, to be aggregated again on the higher-level programming level, or higher-level programming language engine, leading to erroneous results.

Figure 8:
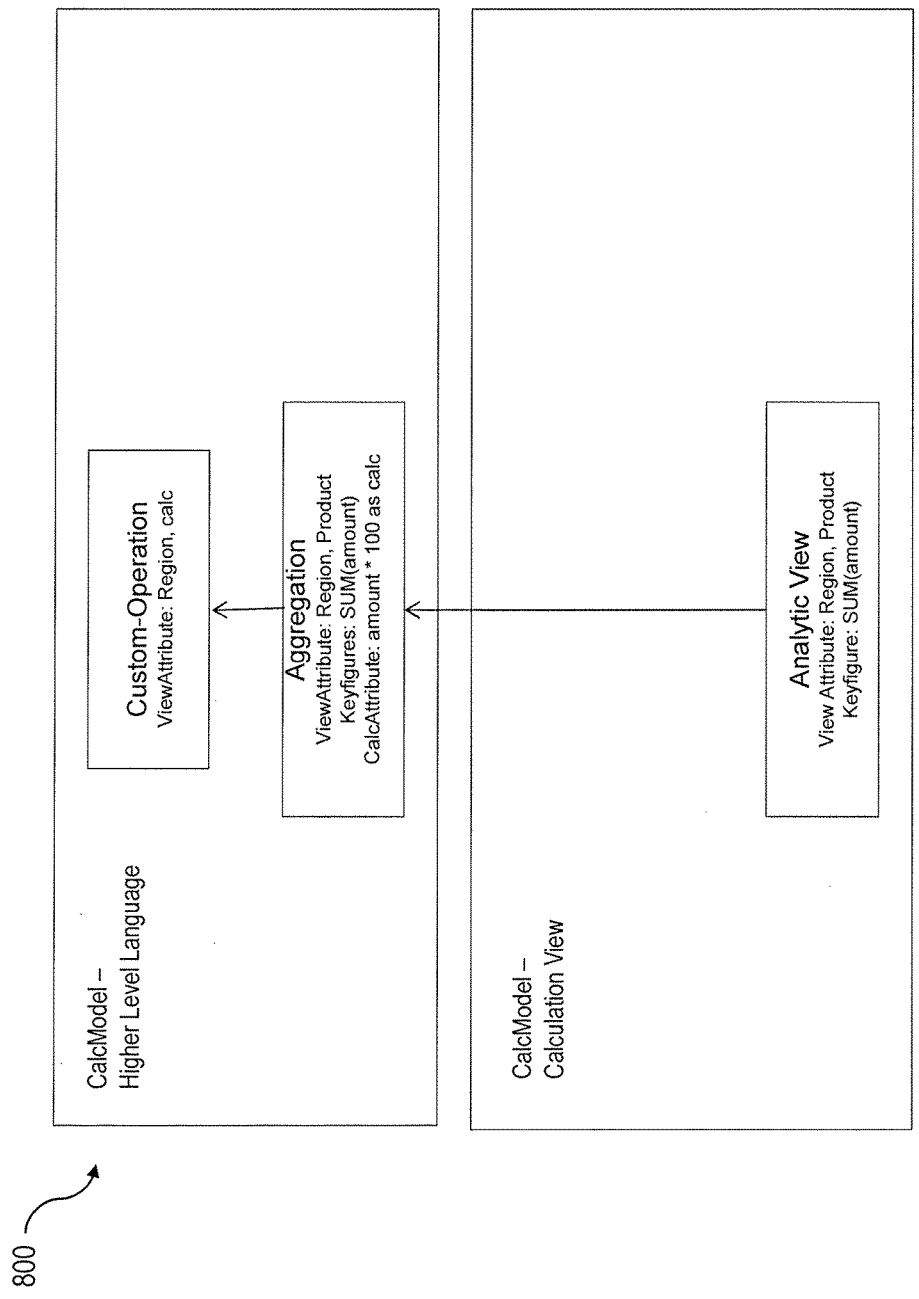

FIG. 8 is a diagram 800 of a query specified by a database application with application of the semantic node for modifying higher-level programming language queries, having one or more elements consistent with the current description. The extended semantic node can be configured to aggregate the aggregator of the base calculation view and the higher-level programming language calculation view. Aggregating both aggregators avoids elements being erroneously aggregated multiple times which can yield erroneous results.

The base aggregator for the base scenario is taken up into the upper scenario so the upper scenario has direct visibility of the top node and can enhance the top node further with the higher-level programming language operators. For example, the aggregator is configured to cause the Keyfigure SUM (calc) to not be manipulated further in the higher level language calculation model, as it is in the base calculation view. The aggregator can be provided by an extended semantic node, such as the extended semantic node illustrated in diagram 600 of FIG. 6.

In some variations, the higher-level programming language level can be an application level. The base calculation view can be associated with the calculation level.

The current subject matter can be used to hide such complex operations (essential for analytic reporting) by using the semantic node in the database and to automatically provide the expected result to the user without having to specify such complex operations. Stated differently, the semantic node can be used to override an aggregation function pre-defined by the query. Additionally the function of the semantic node can be bound to a specific area of operation like business warehouse (BW), SAP PlanningScenarios, or SAP MDX. Consequently, a semantic node in a BW scenario can allow for overwriting of aggregation functions of keyfigures but not in MDX scenarios. The advantage of the current approach is that the logic can be implemented once within the database and can be consumable by every database application. Further, the use of a higher-level programming language semantic node as described herein provides enhanced usability as deep knowledge of modeling is not required. Additionally, such approach scales very well because such complex logic need not be distributed to broad audiences.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method for implementation by one or more data processors forming at least part of a computer system, the method comprising:
   receiving, by a database server, a higher-level language query associated with a calculation scenario that defines a data flow model that includes a plurality of calculation nodes, each calculation node defining one or more operations to execute on the database server, at least one of the calculation nodes being a semantic node specifying an operation involving aggregating previously aggregated database elements, the higher-level language query producing erroneous results when aggregating previously aggregated database elements;
   modifying, by the database server, the higher-level programming language query using the semantic node, the modified higher-level programming language query producing accurate results;
   modifying, by the database server, the calculation scenario based on the modified higher-level programming language query;
   instantiating, by the database server, the modified calculation scenario;
   executing, by the database server, the operations defined by the calculation nodes of the modified calculation scenario to result in at least one result set; and
   providing, by the database server to the application server, the at least one result set.

2. The method of claim 1, wherein the query is received from a remote application server.

3. The method of claim 1, wherein the received higher-level programming language query is configured to specify an aggregation function on a calculated attribute, and wherein modifying the higher-level programming language query using the semantic node overrides the aggregation function on the calculated attribute causing the calculated attribute to be copied to the higher-level programming language query.

4. The method of claim 1, wherein at least a portion of paths and/or attributes defined by the calculation scenario are not required to respond to the higher-level programming language query, and wherein the instantiated calculation scenario omits the paths and attributes defined by the calculation scenario that are not required to respond to the higher-level programming language query.

5. The method of claim 1, wherein at least one of the calculation nodes filters results obtained from the database server.

6. The method of claim 1, wherein at least one of the calculation nodes sorts results obtained from the database server.

7. The method of claim 1, wherein the calculation scenario is instantiated in a calculation engine layer by a calculation engine.

8. The method of claim 7, wherein the calculation engine layer interacts with a physical table pool and a logical layer, the physical table pool comprising physical tables containing data to be queried, and the logical layer defining a logical metamodel joining at least a portion of the physical tables in the physical table pool.

9. The method of claim 1, wherein an input for each calculation node comprises one or more of: a physical index, a join index, an OLAP index, and another calculation node.

10. The method of claim 9, wherein each calculation node has at least one output table that is used to generate the final result set.

11. The method of claim 10, wherein at least one calculation node consumes an output table of another calculation node.

12. The method of claim 1, wherein the executing comprises:
   forwarding the query to a calculation node in the calculation scenario that is identified as a default node if the query does not specify a calculation node at which the query should be executed.

13. The method of claim 1, wherein the query identifies a particular calculation node, and wherein the executing comprises:
   forwarding the query to the calculation node specified in the query at which the query should be executed.

14. The method of claim 1, wherein the calculation scenario comprises database metadata.

15. The method of claim 1, wherein the calculation scenario is exposed as a database calculation view.

16. The method of claim 1, wherein the executing comprises:
   invoking, by a higher-level programming language runtime engine, a calculation engine to execute the calculation scenario behind the database calculation view.

17. The method of claim 16, wherein the calculation engine invokes the higher-level programming language runtime engine for executing set operations.

18. The method of claim 17, wherein the higher-level programming language runtime engine invokes the calculation engine when executing higher-level programming language queries with calculation views.

19. The method of claim 1, wherein aggregating previously aggregated database elements comprises at least one of exception aggregation, aggregating calculated keyfigures, or summing converted currency values.

20. A system comprising:

at least one data processor; and, memory coupled to the at least one data processor, the memory storing instructions, which, when executed, cause the at least one data processor to perform operations comprising:

receiving, by a database server, a higher-level language query associated with a calculation scenario that defines a data flow model that includes a plurality of calculation nodes, each calculation node defining one or more operations to execute on the database server, at least one of the calculation nodes being a semantic node specifying an operation involving aggregating previously aggregated database elements, the higher-level language query producing erroneous results when aggregating previously aggregated database elements;

modifying, by the database server, the higher-level programming language query using the semantic node, the modified higher-level programming language query producing accurate results;

modifying, by the database server, the calculation scenario based on the modified higher-level programming language query;

instantiating, by the database server, the modified calculation scenario;

executing, by the database server, the operations defined by the calculation nodes of the modified calculation scenario to result in at least one result set; and providing, by the database server to the application server, the at least one result set.

* * * * *